United States Patent
Sahraoui et al.

(10) Patent No.: US 7,366,882 B2
(45) Date of Patent: Apr. 29, 2008

(54) ADDRESS CALCULATION UNIT FOR AN OBJECT ORIENTED PROCESSOR HAVING DIFFERENTIATION CIRCUITRY FOR SELECTIVELY OPERATING MICRO-INSTRUCTIONS

(76) Inventors: Zohair Sahraoui, 6243 Castille Court, Gloucester, Ontario (CA) K1C 1X4; Gary Ciambella, 160 Chapel #502, Ottawa, Ontario (CA) K1N 8P5

( * ) Notice: Subject to any disclaimer, the term of this patent is extended or adjusted under 35 U.S.C. 154(b) by 0 days.

(21) Appl. No.: 10/144,241

(22) Filed: May 10, 2002

(65) Prior Publication Data

US 2003/0018879 A1    Jan. 23, 2003

Related U.S. Application Data

(60) Provisional application No. 60/290,304, filed on May 10, 2001.

(51) Int. Cl.
*G06F 9/26* (2006.01)
*G06F 12/00* (2006.01)

(52) U.S. Cl. ............... 712/221; 712/230; 711/214; 711/219; 711/213; 711/220

(58) Field of Classification Search ............... 711/214, 711/219, 213, 220; 712/1, 202, 221, 230; 709/224

See application file for complete search history.

(56) References Cited

U.S. PATENT DOCUMENTS

| | | | | |
|---|---|---|---|---|
| 5,708,838 | A * | 1/1998 | Robinson .................. | 709/202 |
| 5,860,154 | A * | 1/1999 | Abramson et al. ......... | 711/220 |
| 6,237,074 | B1 * | 5/2001 | Phillips et al. ............ | 711/213 |
| 6,636,901 | B2 * | 10/2003 | Sudhakaran et al. ...... | 719/327 |
| 6,668,285 | B1 * | 12/2003 | Ross et al. ................ | 719/316 |
| 6,714,977 | B1 * | 3/2004 | Fowler et al. ............. | 709/224 |

\* cited by examiner

*Primary Examiner*—Hong Kim

(57) ABSTRACT

A processor is provided with a address calculation unit so as to generate addresses for elements of object oriented data structures in one processor clock cycle.

16 Claims, 12 Drawing Sheets

CASE 2: LOCAL VARIABLE READ && LOCAL STACK WRITE

FIGURE 10A
Byte Array Structure

@ = read_bus1*M + offset + base_address
   (index)*1   + 8 + A000

FIGURE 10B
Char/Short Array Structure

@ = read_bus1*M + offset + base_address
   (index)*2   + 8 + A000

FIGURE 10C
Integer Array Structure

@ = read_bus1*M + offset + base_address
   (index)*4   + 8 + A000

FIGURE 10D
Long Array Structure

@ = read_bus1*M + offset + base_address
   (index)*8   + 8 + A000

ADDRESS CALCULATION UNIT FOR AN OBJECT ORIENTED PROCESSOR HAVING DIFFERENTIATION CIRCUITRY FOR SELECTIVELY OPERATING MICRO-INSTRUCTIONS

RELATED APPLICATIONS

The present invention relates to and claims priority from commonly assigned Provisional Application No. 60/290,304 filed on May 10, 2001.

FIELD OF THE INVENTION

The present invention relates to calculating addresses in a processor. More particularly, the present invention relates to a method and apparatus for calculating addresses of high-level object-oriented elements stored in a memory in a single processor clock-cycle.

BACKGROUND

While Java has grown in popularity in recent years, many of its critics stand fast on their claim that Java is prohibitively slow to execute in typical software based Java Virtual Machines (JVM), despite exhaustive efforts to optimize the latter. Although Just-in-Time (JIT) compilation technologies provide some benefits, the so-called code-bloat side effect rules out the use of this technology in the embedded systems space.

The most promising approach for increasing the performance of Java execution has been through the use of Java native processors, designed with the Java Virtual Machine (JVM) instruction set as its processor instruction set. While several Java native processor designs have been disclosed thus far, all have been locked-into traditional processor design paradigms, failing to focus on the specific nature of the JVM.

One of the most commonly executed operations in any implementation of the Java Virtual Machine (JVM) is the series of pointer resolutions required for the execution of opcodes that are used to interact with underlying JVM data structures. In general, this type of opcode requires some pointer arithmetic in order to extract from the JVM data structures all the arguments needed for the completion of its execution. The importance of this pointer arithmetic is highlighted by the fact that these type of opcodes occur with a very high frequency in a typical Java trace, and also by the fact that the same pointer arithmetic is invoked several times within the same opcode execution. In particular, so-called invoke instructions, provided to invoke methods in Java, involve several such calculations. It is known that invoke instructions consume 20-40% of execution, thus improving the execution of invoke instructions would yield a substantial overall speed improvement.

In regards to the above, in order to improve the performance of a hardware implementation of a JVM, or any other object-oriented based processing system, it is desirable to accelerate the execution of the pointer arithmetic, and increase the level of concurrency with other operations of the JVM.

Previous attempts at implementing pointer arithmetic in address calculation missed the importance of these types of operations, and therefore adopted under-performing approaches to the issue. In particular, pointer arithmetic has previously been broken up into atomic operations that a standard ALU can perform. Drawbacks with this approach include:

Each atomic operation requires one clock cycle to complete, in addition to the normal instruction cycle;
Intermediate results must be saved temporarily in a register; and
The pointer arithmetic will tie up the ALU until the final address is calculated.

SUMMARY

Address calculations for accessing elements contained in data structures of an object-oriented system, may utilize one or more of the following atomic operations:

Scaling: involves converting 16 or 32-bit addresses into byte addresses; or computing the location of an array element within an array;
Offset: involves accessing an element within a data structure with a predefined offset to the beginning of the data structure; and
Add/Sub: an operation that determines the target address.

Each one of these operations consume one clock cycle when performed by prior art ALUs. In contrast, embodiments of the present invention use a hardware unit that can compute the final address in one clock cycle. This hardware unit is able to take an argument, scale it, add to it an offset, and finally add the result to the data structure address all in one clock cycle.

An address calculation unit (ACU) is proposed that generates all memory addresses that a virtual machine may require for the execution of an interpreted language. The address generation process lasts at most one clock cycle and handles specific address calculations required in typical interpreted languages for access to data structures specific to the virtual machine. These calculations are done in the address calculation unit rather than in an ALU and result in a large increase in processing speed.

In one embodiment, a novel base address register is provided for object oriented memory accesses. This register may be used to temporarily hold the base address of an object in an interpreted language program so that it is automatically factored into the address calculation process. In the Java language, for example, references with respect to an object such as a getfield instructions could be sped up using this method.

Address calculation may be accelerated by providing frequently used data structure offsets immediately in hardware—an advantage that may be realized by implementing an object-oriented system in hardware, heretofore unexploited in object-oriented processor design.

In one embodiment, an object-oriented language processor includes an address calculation unit comprising: one or more inputs for receiving a local variable pointer; one or more inputs for receiving a local variable number; a scaling portion for scaling the local variable number; and a generating portion for generating memory addresses for elements contained in one or more object oriented data structures by using the scaled local variable number, wherein the generating portion generates the memory addresses in a single processor clock-cycle. The address calculation may further comprise a memory, wherein the memory contains one or more base address. The base addresses may comprise base addresses of the object oriented data structures.

In one embodiment, an object oriented processor includes an ACU, the ACU comprising a generating portion for generating memory addresses for elements contained in object oriented data structures, wherein the generating portion generates the addresses in a single clock-cycle. The ACU may comprise a circuit, the circuit for providing one or more object oriented data structure offsets to the ACU. The data structure offsets may comprise offsets for data structures used by the object oriented processor. The processor may comprise a Java native processor. The processor may further comprise an ALU.

In one embodiment, a method of calculating addresses in an object-oriented processor may comprise: a. receiving a base value; b. receiving an index; c. scaling the index to produce a scaled index; and adding the scaled index to the base value to generate an address, wherein steps a. to d. are accomplished in a single clock cycle of the processor.

In one embodiment an object oriented processor includes a base address register comprising: a register for holding the base address of an object. The object-oriented processor may comprise a Java processor. The processor may comprise an address calculation unit, wherein the register is coupled to the address calculation unit via a dedicated connection. The address calculation unit may further comprise a circuit, the circuit for providing one or more object oriented data structure offsets to the address calculation unit, and wherein the address calculation unit generates memory addresses for elements contained in the one or more object oriented data structures in a single processor clock-cycle.

In one embodiment. a processor includes an ACU, the ACU comprising: a circuit for receiving a control word from the processor, a circuit for receiving a stack pointer, a local variable pointer, and a base address; an adder circuit; a selecting circuit for selecting one of the stack pointer, local variable pointer and base address, the selecting circuit producing an output comprising the selection, the output coupled to the adder; a circuit for receiving a local variable number; and a circuit for shifting the local variable number, coupled to the circuit for receiving a local variable number, the circuit for shifting producing a shifted local variable number output, the output coupled to a second port of the adder.

In one embodiment. a processor may comprise an ACU, the ACU comprising inputs for receiving arguments that reference object oriented data structures. The arguments may comprise absolute addresses for the data structures, and a control word. The control word can specify an operation, a scaling factor, and an offset. The ACU may comprise a control for receiving inputs from one or more processor hardware blocks to generate addresses for elements of the object oriented data structures. The addresses may be generated in one processor clock cycle. The processor may also comprise a separate ALU.

The present address calculation unit is flexible enough to offer different types of operations. It can apply different scaling factors chosen from a predefined set. It can add different offsets, as required by the JVM data structure. Finally, it can create different combinations of the inputs in a wide range of address equations.

DESCRIPTION OF DRAWINGS

FIGS. 10A, 10B, 10C, and 10D illustrate access array elements, stored in array object data structures.

DESCRIPTION

As used herein, the term "object-oriented processor" may be generally defined as a processor whose instruction set includes operations upon high-level data objects. Examples of object-oriented processors include, but are not limited to, Java native processors, adjunct Java hardware accelerators, and RISC machine variants. High-level data objects comprise complex data structures stored in a memory that may represent arrays, classes, instances of classes, interfaces, method entries, and the like. While embodiments of the present invention are described in the context of a Java native processor, those skilled in the art will understand that the principles taught herein apply equally to any object-oriented language-based hardware processing device.

Figure 1:
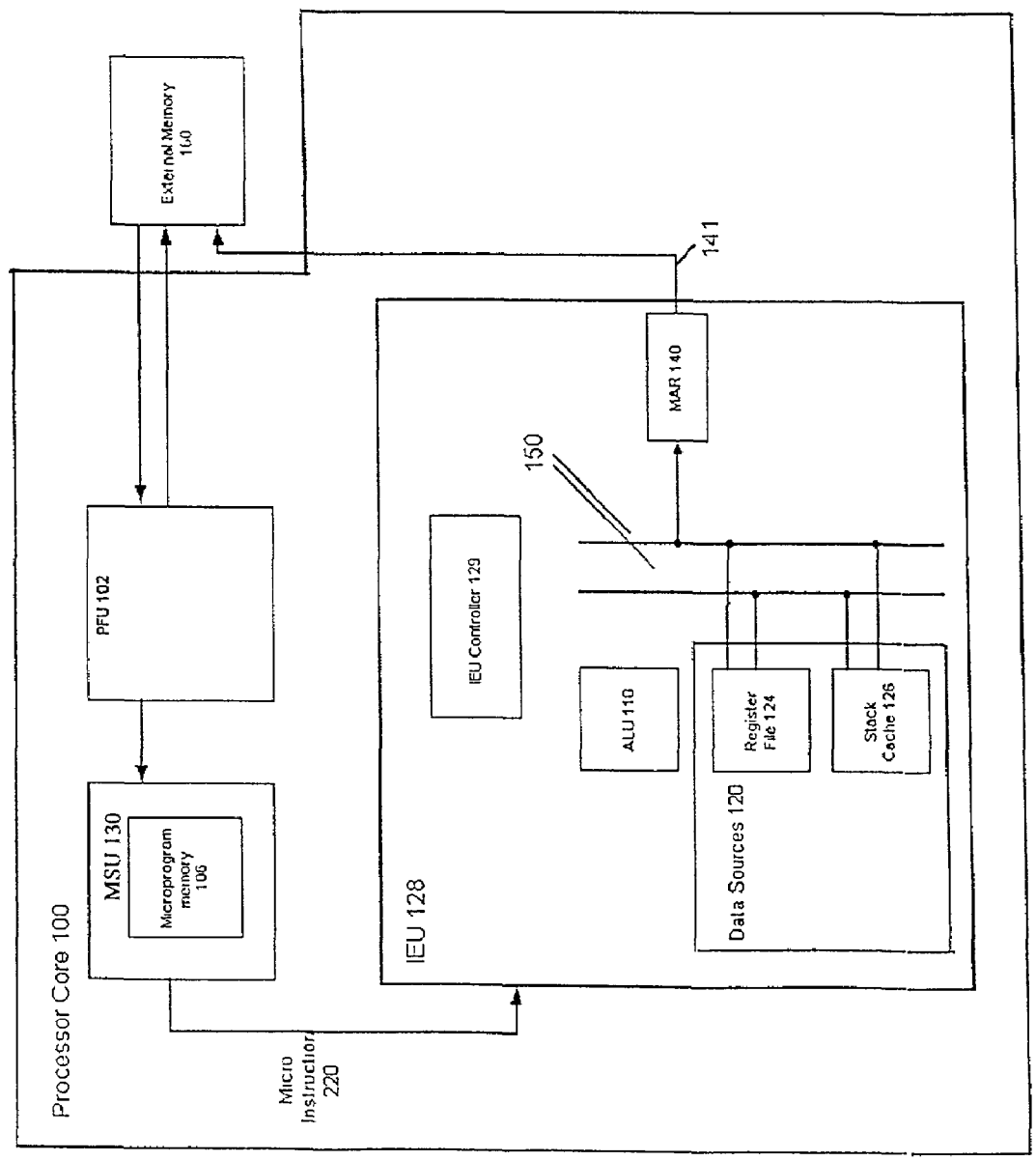
FIG. 1 illustrates a prior art object-oriented processor core.

Referring to FIG. 1, a prior art object-oriented processor core 100 is illustrated. Processor core 100 comprises an instruction pre-fetch unit (PFU) 102, a microsequencer unit (MSU) 130, and an instruction execution unit (IEU) 128. PFU 102 may fetch instructions from memory 160 and may store them in an instruction buffer. MSU 130 receives instructions from PFU 102 and fetches corresponding microprograms from its microinstruction memory 106. Microprograms comprise one or more microinstructions for implementing instructions received from PFU 102. MSU 130 issues microintructions, or microwords to blocks in IEU 128. Instruction execution unit 128 (IEU) controls and executes microinstructions issued by MSU 130. IEU 128 may comprise an arithmetic logic unit (ALU) 110, a block generally referred to as data sources 120, IEU controller 129, memory address register (MAR) 140, and one or more system buses 150. Memory Address Register 140 is coupled to an external memory 160 via an address bus 141. Processor core 100 is operatively coupled to an external memory 160, for example, as random access memory (RAM), essentially directly thereto or via a memory management unit (MMU).

As used herein, the term external memory is to include memory chips, memory integrated on the same chip as the processor core and memory-mapped peripherals located on or off chip. Data sources block 120 may comprise stack caches 126, and one or more register files 124 comprising a program counter (PC) register, a stack pointer (SP) register, a current class (CC) register, a constant pool register (CP) register, and the like.

Certain instructions require access to external memory or memory-mapped peripherals to read or write data. External memory is accessible via binary addressing such that certain fixed units of memory are addressable. Typically, each address corresponds to 1-byte (8 bits) of information in external memory. Thus, for processor core 100 to read or write to external memory at a specific address, an address must be generated and supplied to external memory. Instructions sets often provide several addressing modes whereby a memory address may be supplied with an instruction in various manners. For example, an instruction may comprise a branch instruction and one or more operands wherein the operands specify a relative address as a branch target. The relative address is normally summed with the value of the program counter to specify a target address relative to the current program counter. Addition steps to generate the target address are typically conducted in the ALU 110 in the processor core, requiring at least a full clock cycle to generate the sum. The sum is then stored in a temporary register such as memory address register 140. The target address then be supplied to external memory to access the desired memory location. In the case of a branch instruction, data comprising one or more instructions may be fetched from external memory from the address supplied by MAR 140 via address bus 141.

Object-oriented native processors, such as Java[™] native processors are designed around complex data structures stored in external memory. Often, to access a target data element in memory, several levels of indirection must be resolved prior to the ultimate access to the memory location. Furthermore, offsets specific to a given JVM implementation are required to access data stored in a data structure in memory. Certain complex opcodes require the resolution of several levels of indirection, using implementation-specific offsets at each level of indirection. The so-called "invoke" opcodes in the Java language are an example of such opcodes. Invoke opcodes typically consume 20-40% of the processing time in most JVM-implementations and comprise multiple cumbersome operations including resolution of multiple levels of indirection in combination with offsets. To further exacerbate matters, offsets are often expressed in terms of multi-byte "entries". Thus, offsets frequently need to be "scaled" to convert their units from "entries" to "bytes" before they may be used in address generation calculations. Typically scaling involves multiplying the offset by one or more powers of two; usually achieved by shifting the offset value one position to the left one position for every power of two in a shifter in ALU 110. Thus, calculation of memory addresses in object-oriented systems is typically far more complex than other types of processors.

Address generation in object-oriented systems, such as object-oriented processors, and especially stack-based object-oriented processors, such as Java native processors, is complex. For instance, to access data and program code at run-time addresses for stack operands, local variables, objects and arrays need to be generated.

Stack Operands

The nature of the stack is such that stack operands are normally accessed only from the top of the stack (TOS), the location of which is usually determined by a stack pointer (SP). The stack pointer may be maintained in a stack pointer register. In some embodiments, the stack pointer actually points to the next available memory location in the memory allocated for the stack (hereafter referred as stack memory). Consequently, the TOS is the memory entry adjacent to the location indicated by the stack pointer. In embodiments where the stack grows along decreasing memory addresses, the TOS located at SP+1. It should be understood that the stack could just as well grow along increasing addresses in which case the TOS would be located at SP−1. Moreover, in certain embodiments, the stack pointer (SP) may actually point directly to the TOS element in the stack. Accordingly, the address required for stack accesses is either the stack pointer itself or the stack pointer with some offset value.

Local Variables:

In most JVM systems, a local variable pointer is maintained to provide access to local variables. The local variable pointer typically holds the address of the lowest numbered local variable (i.e. local variable zero). To access a local variable of a method, the local variable pointer is used with an offset value. Local variable zero may be accessed via the local variable pointer without an offset (or with an offset of zero), while higher numbered local variables are accessed through with local variable pointer with an offset corresponding to the local variable number. For instance, adding an offset of five to the local variable pointer would generate the address of local variable five (the sixth local variable).

Objects:

Objects in typical JVM systems are typically accessed as a stack operand or a local variable. The stack operand or local variable contains a reference to an object data structure representing the object. Methods or fields of objects are accessed via several levels of indirection through the object reference. Offsets specific to the object data structure are required to access the desired element. Such offsets may be provided, for instance, to skip header information contained in the object data structure, other elements, and the like.

Arrays

Arrays are handled as objects in the JVM and thus in Java native processors. Array elements are stored in array object data structures. Array object data structures, typically include a header portion to store information such as the data type (or class) of the array elements, the length of the array, the dimensions of the array, and so forth. However, unlike objects, arrays further require an index into the elements of the array. For instance, index i would be added to the array reference to access the $i^{th}$ element of the array.

Scaling

Where offsets and/or indexes are employed to calculate an address of any of the above-described elements, they sometimes need to be adjusted to properly address the elements. For instance, depending on the data type (e.g.: short, integer, long, double, char, etc. . . . ) of the elements in an array, more than one byte of memory may be required for its storage. For example, integer array elements may be stored across 32-bits (4 bytes). Consequently, the index into the integer array must be scaled. Furthermore, when a method is invoked and a method frame is constructed in stack memory, scaled offsets are required to determine the values of local variable, frame and stack pointers.

Scaling comprises correcting the offset to skip a predetermined number of bytes for each entry. Thus, an index, i, to the $i^{th}$ element of the integer would be scaled by multiplying i by four to account for 4-byte array elements. Similarly, where local variables are typically stored across 32-bit entries, the local variable offset would be scaled by multiplying the offset by four.

Address generation calculations may be typically handled in an ALU 110 of a processor core 100 and require one processor clock cycle for each ALU 110. The execution of such instructions consumes a significant amount of time. Given the frequency of complex instructions such as invokes, a need exists in the art for improvement in the area of address generation.

The present invention provides embodiments for calculating complex addresses in a single clock cycle Increased instruction-level parallelism may be realized whereby multiple operations may be performed in a single clock cycle in a single processor.

Figure 2:
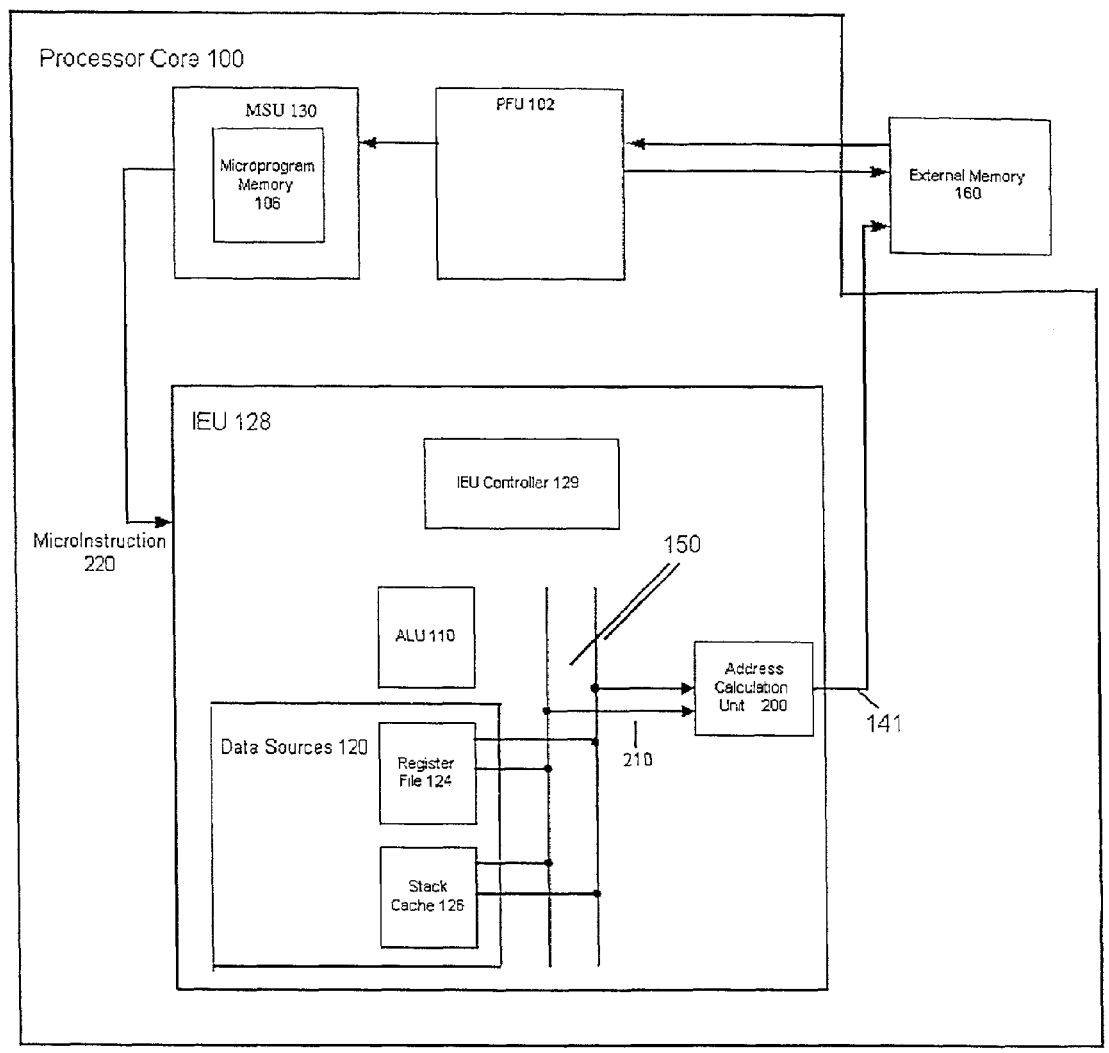
FIG. 2 illustrates a processor core in accordance with an embodiment of the present invention.

Referring now to FIG. 2, an embodiment of the present invention is illustrated. Address calculation unit 200 is provided in an object-oriented processor core 100. Interaction of various blocks of processor core 100 in address generation calculations is illustrated in FIG. 2. Notably, while ALU 110 may still be provided, it is not required for address calculation in accordance with the present invention. Address calculation unit 200 comprises functionality required for address generation. Address calculation unit 200 is operatively coupled to one or more read buses 150 via connections 210 and to external memory via address bus 141. Address calculation unit 200 calculates an address with its given data inputs and supplies an address to external memory 160 in a single clock cycle.

Figure 3:
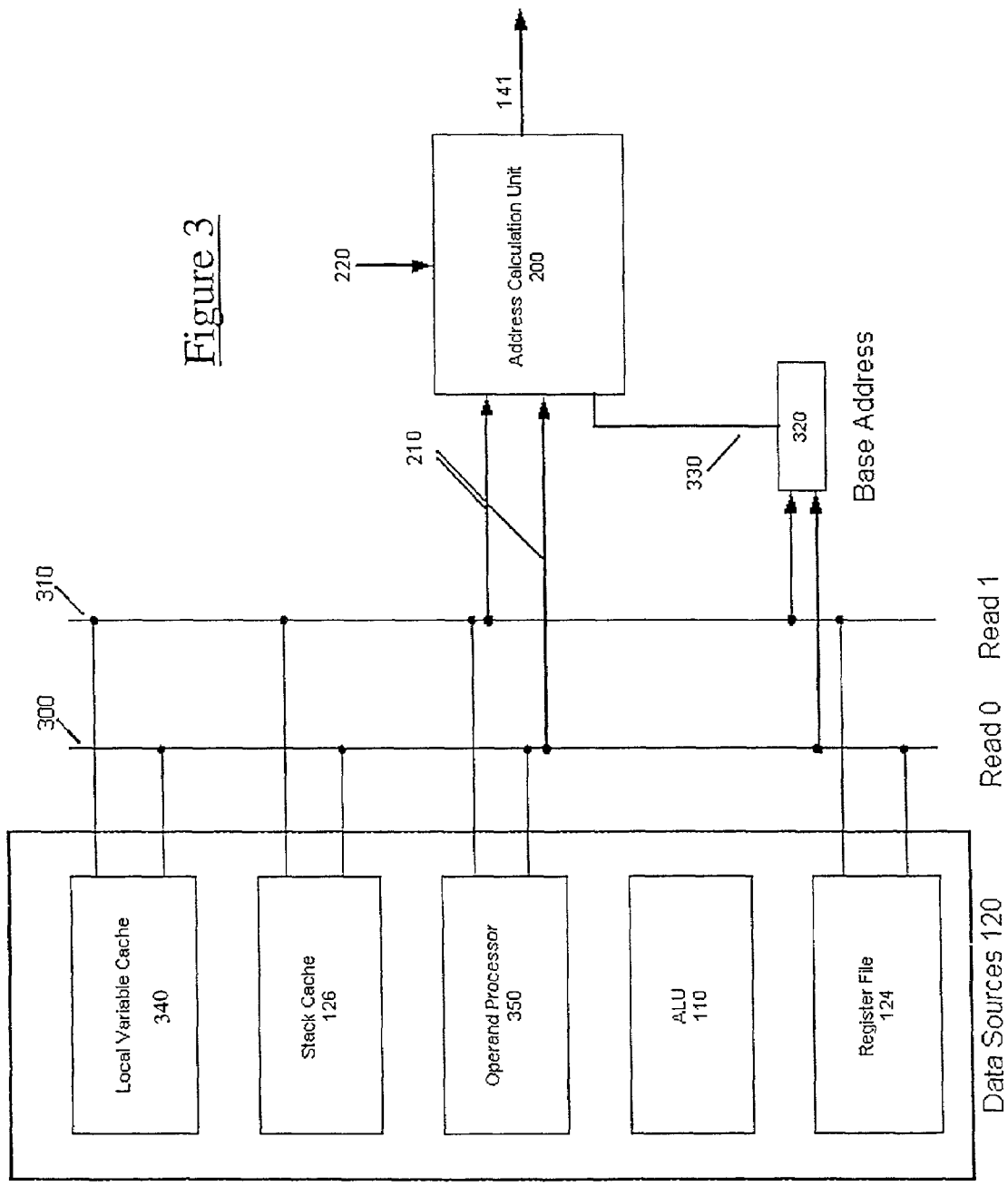
FIG. 3 illustrates an embodiment in which an example of a data source block is depicted.

Referring now to FIG. 3, an embodiment of the present invention is illustrated in which an example of data sources block 120 is depicted. In this example, data sources block 120 comprises register file unit 124, operand processor unit 350 for providing instruction operands obtained from PFU 102, stack cache 126 for caching the top elements of stack memory on-chip, local variable cache 340 for caching certain local variables on-chip, and ALU 110 which is shown outside the data sources block 120 but in some embodiments may be within the data sources block. In this example, read buses 150 comprises two read buses, read0 300 and read1 310. Each unit of data sources block 120 is coupled to each read bus read0 300 and read1 310. It should be understood that the present invention may be practiced with more or fewer read buses. Where multiple read buses are provided, certain units of data sources block 120 might be coupled to only one of the read buses. IEU controller 129 is coupled to units of data sources block 120 via control signals in order to control which block 120 asserts their values on the read buses 300 and 310. Data source blocks 120, IEU controller 129, and address calculation unit 200, all receive the current microinstruction that is applied to IEU 128 from MSU 130. Control signals between IEU controller 129 and blocks 120 are ultimately driven by the current microinstruction.

Address calculation unit 200 is coupled to each read bus 300 and 310 via connections 210. In this way, any of the units in data sources block 120 may supply input data to the address calculation unit 200 for use in address generation calculations. A base address register 320 may be provided and operatively coupled to address calculation unit 200 via dedicated connection 330. Base address register 320 provides a data source for address calculation unit 200 for implicit inclusion in most address generation calculations. While not essential to the operation of address calculation unit 200, the base address register 320 expands the number of values that may be simultaneously supplied thereto, beyond the limitation imposed by the number of read buses 300 and 310. Furthermore, base address register 320 is particularly advantageous in generating addresses for elements contained in object-oriented data structures, especially when multiple accesses are to be conducted on the same data structure in the execution of a single instruction. Base address register 320 is operatively coupled to read buses 300 and 310 so that any unit of data sources block 120 may load the same with a value to be used as the base address. One skilled in the art will understand that base address register 320 could be connected to just one of read buses 300 and 310 and the appropriate read bus would need to be used to load the base address register. Address calculation unit 200 also receives microinstructions via input 220. Address calculation unit 200 decodes microinstructions applied to input 220 to determine the inputs and operations required, if any, for the execution of a given microinstruction.

Figure 4:
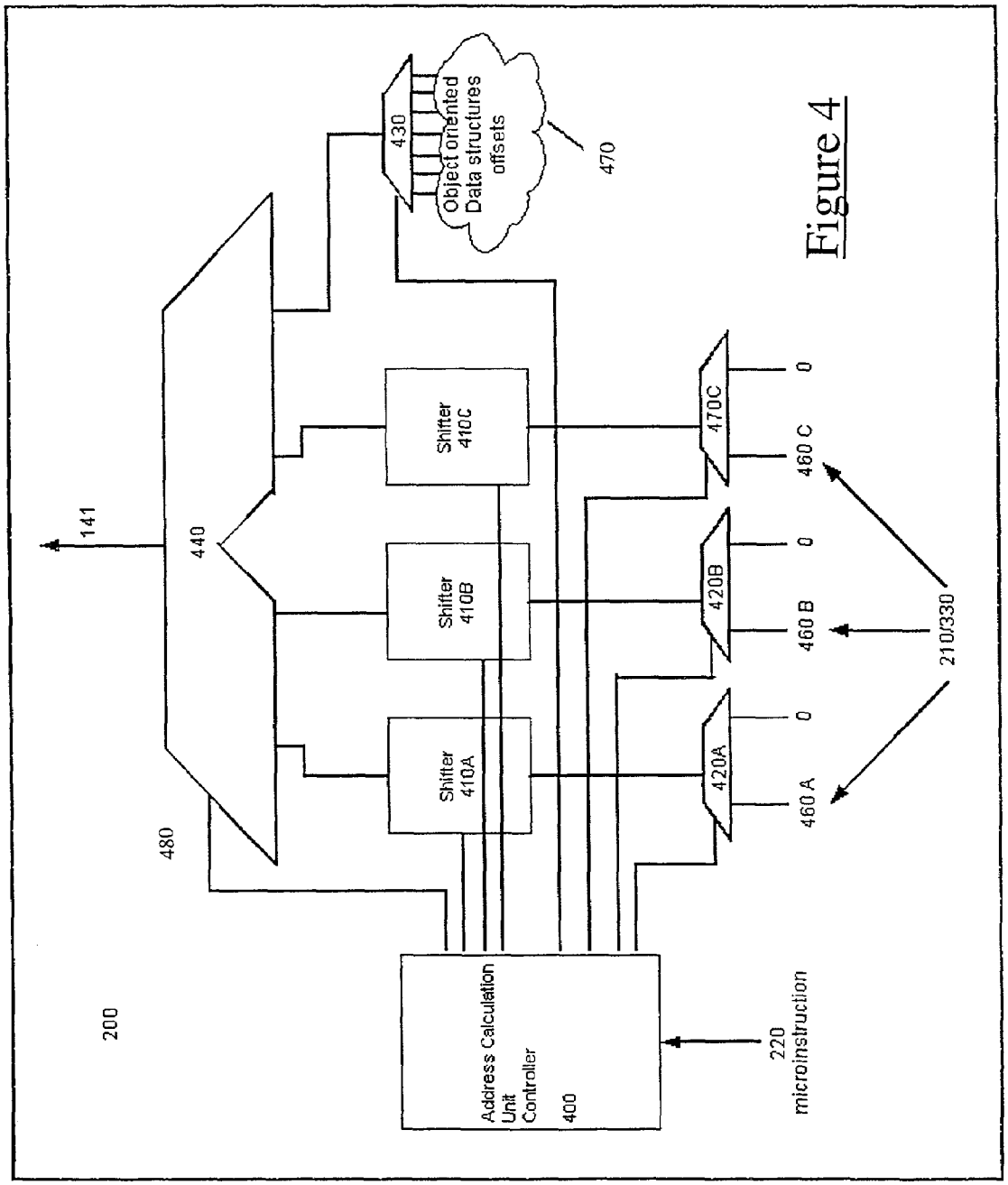
FIG. 4 illustrates details of an address calculation unit.

Referring now to FIG. 4, details of an address calculation unit 200 in accordance with an embodiment of the present invention is illustrated. Data inputs 460A, 460B, and 460C are fed into multiplexers 420A, 420B, and 420C, respectively. Data inputs may be coupled to either of the read buses 300 or 310, or to base address register 320 via dedicated input 330. So-called "null", or zero, values 465A, 465B, and 465C are applied to each of input multiplexers 420A, 420B, and 420C, respectively. First, second, and third shifters 410A, 410B, and 410C are provided, the inputs thereof coupled with outputs of input multiplexers 420A, 420B, and 420C, respectively. Offset multiplexer 430 is provided having object-oriented data structure offsets 470 applied to its inputs. Outputs of offset multiplexer 430, and first, second, and third shifters 410A, 420A, and 430A are coupled to adder 440. In one embodiment, adder 440 comprises a 32-bit carry save adder (CSA). In one embodiment, adder 440 receives as input, an augend, an addend, and a carry-in input, wherein the adder inputs comprise any three of shifter 410A, 410B, and 410C outputs and offset multiplexer 430 output. The output of adder 440 comprises an address that may be supplied to external memory 160 via address bus 141. Address calculation unit controller 400 is provided for receiving a microinstructions 220 and generating control signals 480 for adder 440, offset multiplexer 430, first, second and third shifters 410A, 410B, and 410C, and first, second and third input multiplexers 420A, 420B, and 420C. Control signals 480 serve to implement the microinstruction 220 to generate the desired result at the output of adder 440. Address calculation unit controller 400 may also interface with other blocks in processor core 100 such as stack cache 126, or local variable cache 340. In one embodiment, read buses 300 and 310, data inputs 460A, 460B, and 460C, object-oriented data structure offsets 470, all multiplexer inputs and outputs, and adder inputs and output may comprise 32-bit wide data paths.

Address calculation unit 200 is capable of generating any address in accordance with the following equation:

$$@=a*F(A)+b*F(B)+c*F(C)+d*D$$

Wherein @ is the generated address;

Variables A, B, C, and D comprise n-bit wide input values; and

Coefficients a, b, c, and d may be 0 or 1.

In one embodiment, input values A, B, and C comprise data inputs 460A, 460B, and 460C, respectively. Functions F (A), F (B), and F (C) comprise scaling the respective data inputs by multiplying by a scaling factor. In a preferred embodiment, the scaling factor comprises powers of two, inclusive of a unit factor (i.e. 1) when no scaling is to be performed on a given data input. Thus, where y represents any of the above variables, F(y) may generate y, 2y, 4y, 8y, etc. . . . In the embodiment illustrated in FIG. 4, scaling is implemented via shifters 410A, 410B, 410C. The shifters operate under the control of respective control signals from controller 400 as determined by decoded microinstructions 220. Input value D may be selected from one of an assortment of hard-wired offset values defined at design time and tied to data structures to be used by object oriented processor core 100. In the embodiment illustrated in FIG. 4, input value D is provided by the output of multiplexer 430. One of a plurality of offset value(s) provided by object-oriented data structure offsets 470 is selected using multiplexer 430 under the control of controller 400. In one embodiment, offsets 470 provide certain constants that are tied to the object-oriented data structures used by a run-time system operating on processor core 100. In one embodiment, the run-time system comprises a hardware implementation of a JVM (i.e. a Java native processor, hardware accelerator, or variants thereof) and the object-oriented data structures comprise those employed by the JVM such as, and not limited to, stack, local variables, class tables, class objects, instance objects, method and interface entries, array objects, interface tables, monitor objects and the like. The provision of offset values associated with the object-oriented data-structures permits the optimization of object-oriented processor core 100. Object-oriented data structure offsets 470 may be provided by a circuit, hardwired, or stored in a memory such as a register. The latter may permit update of the offsets should changes be made to the object-oriented data structures. Coefficients a, b, and c may be implemented by selection of the null inputs 465A, 465B, or 465C. Similarly, object-oriented data structure offsets may include a null value to implement coefficient d. Accordingly, a null at inputs 465A, 465B, 465C, or a null offset in offsets 470, may correspond to the associated coefficient having a value of zero. Otherwise, the coefficient holds a value of one and the associated input value A, B, C, or D is included in the address generation calculation.

Figure 5:
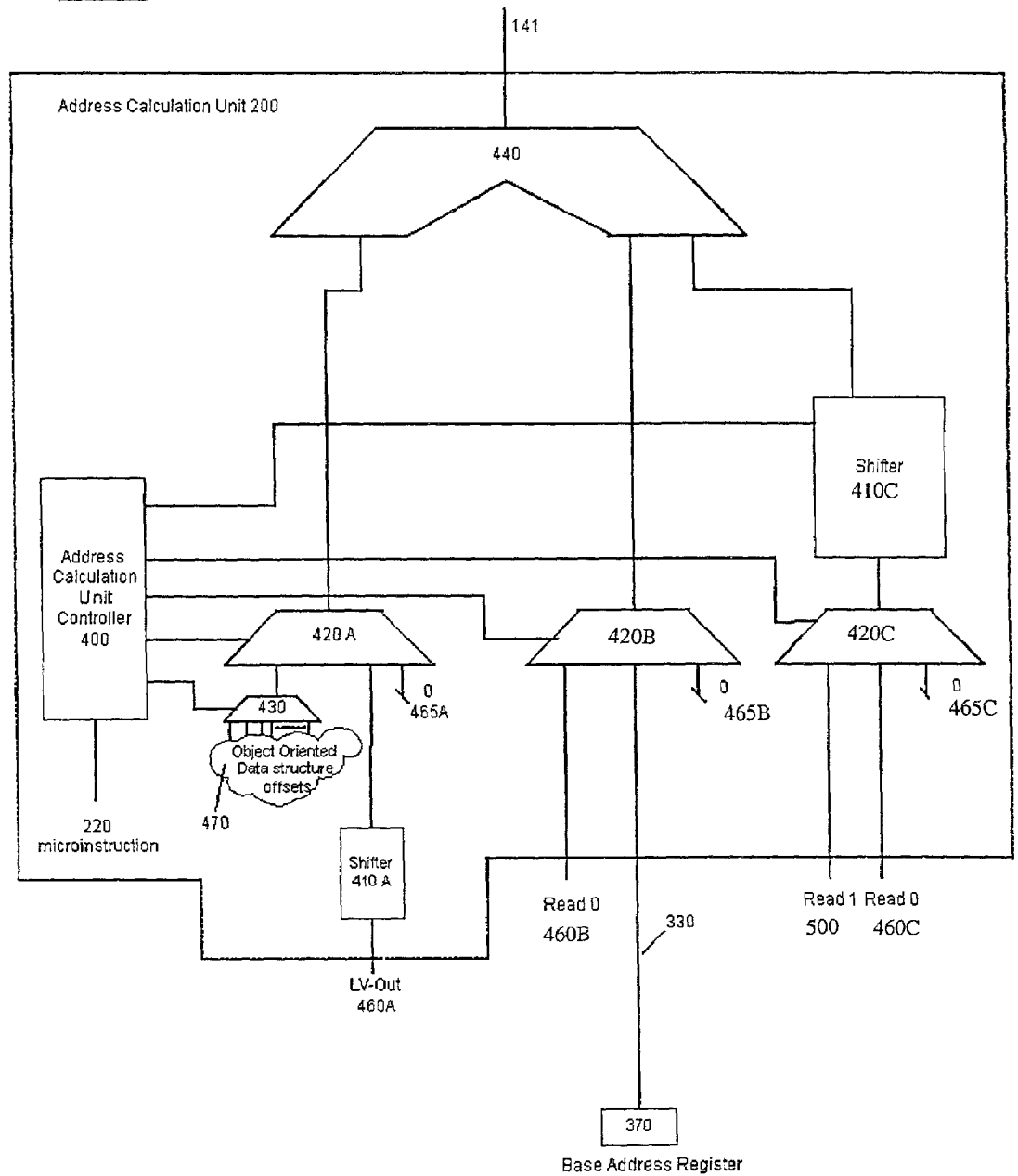
FIG. 5 illustrates details of another embodiment of an address calculation unit.

Referring now to FIG. 5, another embodiment of address calculation unit 200 is illustrated. Address calculation unit 200 of FIG. 5 includes the following modifications. Shifter 410A has been moved from the output of first input multiplexer 420A to the input thereof. Shifter 410A is hardwired to perform a specific scaling operation. In the present embodiment, since the local variables comprise 32-bit data, and addresses are byte addresses, the scaling factor is four—thus shifter 410A implements a left shift two operation. Data input 460A is coupled to the input of shifter 410A and comprises a hardware based input. Specifically, a signal LV_OUT generated by local variable cache 340 is provided as a side-band signal. LV_OUT provides the index of a local variable when local variable cache requires memory access for a write-back or fetch of a local variable from external memory 160. Accordingly, when local variables need to be flushed back to memory or a local variable miss has occurred, local variable cache 340 generates a request to address calculation unit by sending the appropriate signal (not shown), the local variable pointer is applied to a read bus 300 or 310, and a local variable index may be supplied as LV_OUT at data input 460A.

Also coupled to an input of first input multiplexer 420A is the output of offset multiplexer 430. Object-oriented data structure offsets 470 include a null value, thus null input 465A may be eliminated. Accordingly, where a null input is desired as the output of first input multiplexer 420A, the null value of offsets 470 may be selected by offset multiplexer 430 with the output of the latter selected by first input multiplexer 420A.

The output of multiplexer 430 is coupled to a third input of multiplexer 420A. Read bus read1 310 is coupled to data input 460B. Base address register 320 is coupled to a third input of second input multiplexer 420B via dedicated connection 330. Read bus read0 300 is coupled to data input 460C. Read bus read1 310 is also coupled to a third data input 500 of third input multiplexer 420C.

The embodiment illustrated in FIG. 5 is an application specific version of the general address calculation unit 200 illustrated in FIG. 4. While the embodiment of FIG. 4 provides flexibility of operations that may be conducted on each input, the embodiment illustrated in FIG. 5 illustrates an economical embodiment of the present invention that may be provided when such flexibility is not required. By way of example, while data inputs 460A, 460B, and 460C, may all be shifted in any single operation in the embodiment of FIG. 4, this functionality may not be required. For instance, where addressing requirements are such that at most one input is ever required to be scaled, designers could adopt a convention to program processor core 100 in such that third input multiplexer selects the read bus carrying the input to be scaled so as to provide the input to shifter 410C.

Figure 6:
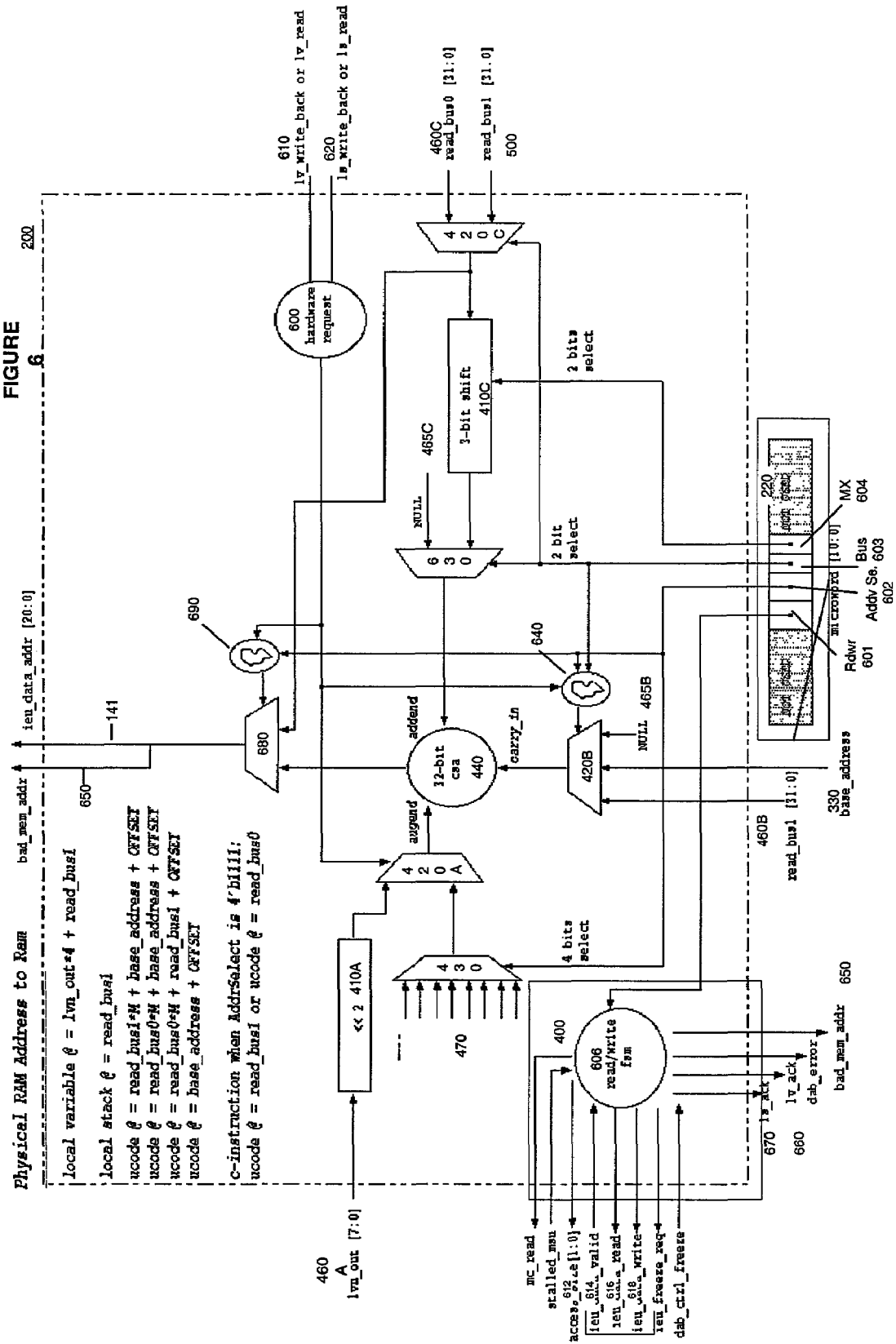
FIG. 6 illustrates details of yet another embodiment of an address calculation unit.

FIG. 6 illustrates another embodiment of the present invention. The address calculation unit 200 illustrated by FIG. 6 is related to the embodiment illustrated in FIG. 5 and to the processor core 100 illustrated in FIG. 3. Data inputs to address calculation unit 200 comprise read bus read1 310 (provided at inputs 460B and 500), base address input 330, read0 input 460C, and local variable index input 460A. The output of second input multiplexer 420B is coupled to adder 440 as the carry-in input thereto. The shifter 410C comprises a 3-bit shifter, the output of which is coupled to the input of an addend multiplexer 630. Null input 465C is also applied as an input to addend multiplexer 630. Shifter 410A is hardwired to conduct a logical shift left two step (<<2) whenever a local variable index is asserted to its input. This specific shift operation is provided to account for 4-byte local variable entries. The local variable index is scaled by multiplying by four, achieved by the shift operation conducted by shifter 410A.

Object-oriented data structure offset block 470 comprises 16 hard-coded offsets. At the core of address calculation unit 200 is a 32-bit carry-save adder 440. Inputs to adder 440 comprise the output of addend multiplexer 630 as the addend, output of first input multiplexer 420A as the augend, and the output of second input multiplexer 420B as the carry-in value. In this embodiment, the addend, augend and carry-in values are 32-bit values. One skilled in the art will understand that other sizes may be used in practicing the present invention. The output of adder 440 is supplied as an input to an address multiplexer 680. Address multiplexer 680 is also coupled to the output of multiplexer 420C.

In this example, in addition to microinstruction 220 based read/write requests, address calculation unit 200 receives hardware-based requests. Local variable cache 345 and stack cache 342 may generate memory read/write requests, causing address calculation unit 200 to generate an address and assert the generated address to external memory. Hardware-based requests are communicated to address calculation unit 200 via local variable hardware request input 610 and stack cache hardware request input 620. A hardware request logic block 600 and first and second selection logic blocks 640 and 690 are provided to generate the requisite control signals to process the address generation request in address calculation unit 200. Hardware request logic block 600 receives hardware request inputs 610 and 620 and selects the higher priority signal of the two when both are simultaneously asserted. The output of hardware request logic block 600 is coupled to the select input of first input multiplexer 420A to select local variable index input 460A on local variable hardware requests. The output of hardware request logic block 600 is also coupled with first and second selection logic blocks 640 and 690 to control address calculation unit 200 on hardware-based memory requests.

Address calculation unit controller 400 is illustrated comprising microinstruction input 602 for receiving microinstructions 220 and a read/write finite state machine 606.

Finite state machine 606 provides interface signals between external memory 160, IEU controller 129, local variable cache 340, and stack cache 126 to coordinate memory accesses and indicate error conditions.

To coordinate memory access to external memory 160, address calculation unit controller 400 provides data_read 616, data_write 618, and access_size 612 to signals. The address calculation unit controller 400 receives a data_valid 614 signal from external memory 160.

Address calculation unit controller 400 provides stack cache acknowledge signal ls_ack 670 and local variable acknowledge signal lv_ack 660 to signal stack cache 142 and local variable cache 340 the completion of a memory read or write request so that they may deassert their hardware request signal 620 and 610, respectively. Examples of finite state machine 604 states are described in detail below.

Address calculation unit error signals are discussed below.

In this example, the microinstruction 220 includes four portions for controlling address calculation unit 200: RdWr 601, AddrSelect 602, Bus 603, and Mx 604. An example of the function of each microinstruction portion is outlined in Table 1.

TABLE 1

Example microinstruction portions for address controller illustrated in FIG. 6.

| RdWr[10:8] (601) | AddrSelect[7:4] (602) | bus[3:2] (603) | mx[1:0] (604) |
|---|---|---|---|
| [ ] RdWr | [ ] AddrSelect | Normal Java-Mode [ ] | [ ] mx |
| 000 Null | 0000 Null | Bus 00 | 00 *1 |
| 001 rd 8 bit | 0001 +1 | baseAddress 01 | 01 *2 |
| 010 rd 16 bit signed | 0010 +2 | Read1, baseAddress 10 | 10 *4 |
| 011 Rd 32 bit | 0011 +3 | Read0, baseAddress 11 | 11 *8 |
| 100 Rd 16 bit unsigned | 0100 +4 | read0, read1 | |
| 101 wr 8 bit | 0101 +20 | C-Operation(when addrSelect is 1111) [ ] | |
| 110 wr 16 bit | 0110 +6 | Bus 00 | |
| 111 wr 32 bit | 0111 +48 | Read1 01 | |
| | 1000 +8 | Read1 10 | |
| | 1001 +16 | Read0 11 | |
| | 1010 +10 | Read0 | |
| | 1011 +32 | | |
| | 1100 +12 | | |
| | 1101 −4 | | |
| | 1110 +14 | | |
| | 1111 C-Operation | | |

Referring to Table 1, RdWr 601 specifies the size and the nature of the memory access. This portion of the microinstruction is supplied to the FSM 606 to govern the operation of the memory transfer between external memory and the requesting block (microinstruction 220, local stack cache 142 or local variable cache 340). The second portion of the microinstruction, addrSelect 602, specifies the object oriented data structure offset to be supplied by offset multiplexer 430 in the current address calculation. This portion of microinstruction 220 is applied to multiplexer 430 as a select input. addrSelect 602 is supplied to first and second selection logic blocks 690 and 640 to signal C-operation mode (described in greater detail below). The third portion of the microinstruction, bus 603, specifies the data inputs to be used in calculating the current address. In this example, four input combinations are presented in a first, Java-mode: baseAddress; read1+baseAddress; read0+baseAddress; and read0+read1. In a second, C-mode, bus 603 may be used to specify either read0 or read1 as an absolute address source. The bus 603 portion of the microinstruction is supplied as a select signal to third input multiplexer 420C and addend multiplexer 630 to implement the above-described functionality. Additionally, bus 603 microinstruction portion is supplied to second selection logic block 640 to be factored into the selection signal supplied to second input multiplexer 420B. The fourth and final portion of the microinstruction, Mx 604, is applied directly to third shifter 410C. In the Java-mode, Mx 604 specifies the scaling that is to be conducted on the data supplied by third input multiplexer 420C. A passthrough mode is provided (indicated by *1) so that the data supplied by third input multiplexer 420C is not shifted, thereby providing greater flexibility to the input of addend multiplexer 630. In the C-operation mode, the Mx 404 portion does not affect the data provided through third input multiplexer 420C because a bypass connection is provided from the output of third input multiplexer 420C directly to address multiplexer 680.

The address calculation unit 200 may support a second operating mode, for example to support the execution of non-object oriented instructions that do not use complex object-oriented data structures. In one embodiment, this may include instructions supplied to support C-language programs, hereafter referred to as "C-instructions", the microinstruction 220 may include a field to indicate to the address calculation unit 200 that an input to the address calculation unit 200 is to be used in this mode. In this embodiment, an unused combination in addrSelect 602 is used to differentiate between C-mode and object-oriented, or Java-mode memory accesses. In particular, the 4'b1111 controls address calculation unit such that the physical RAM address is simply taken off one of the buses (read0 300 or read1 310) without further calculation. In the present example, the third microinstruction portion, bus 603, specifies the source bus for the C-mode.

Address calculation unit 200 serves to generate addresses for any block requiring access to external memory. In the embodiment of FIG. 6, used in the processor core 100 illustrated in FIG. 3, the address calculation requests may originate from any of the following blocks:

Local stack cache 126: on stack cache misses and spill backs;
Local variable cache 340: on local variable cache misses or flushes;
Microinstruction-initiated memory accesses.

Table 2 shows the memory requirements needed in the address IEU 128 during execution.

TABLE 2

Addressing needs of various blocks.

| Block requesting memory access | Read | Write | Inputs required to calculate address (read or write) |
|---|---|---|---|
| Stack cache (126) | Local stack needs to read back data that was spilled and written back to memory. Local stack needs to read when there is nothing on the stack and there is a stack operation. ieu_data_in: local stack | Local stack needs to write back data in case of a stack spill (overflow). | ieu_data_addr = read_bus1<br>ieu_data_out = bus0 |
| Local variable cache (340) | Local variables need to read data on cache misses. ieu_data_in: local variable | Data writes to memory from the local variable when the location that is write accessed is dirty. That is, the data in the register is different than what is stored in memory or when the local variable cache is flushed. | ieu_data_addr = lvn_out*4 + read_bus1<br>lvn_out (8 bits) = dedicated port connection<br>ieu_data_out = bus0 |
| Microinstruction (220) | IEU unit needs to issue read accesses to memory or peripheral registers which are memory-mapped. ieu_data_in: local stack, local variable, or register file (status registers) | IEU unit needs to issue write accesses to memory or peripheral registers which are memory-mapped. | There are many ways a microword can formulate an address. Address formulation is controlled by the microword field and can take several formats. Examples formats are:<br>a) ieu_data_addr = base_addr + read_bus1*M + offset<br>b) ieu_data_addr = base_addr + read_bus0*M + offset<br>c) ieu_data_addr = read_bus0*M + read_bus1 + offset<br>d) ieu_data_addr = base addr + offset<br>where:<br>base_addr = dedicated connection<br>offset = internal hard-coded offsets<br>ieu_data_out = bus1 |

Figure 7:
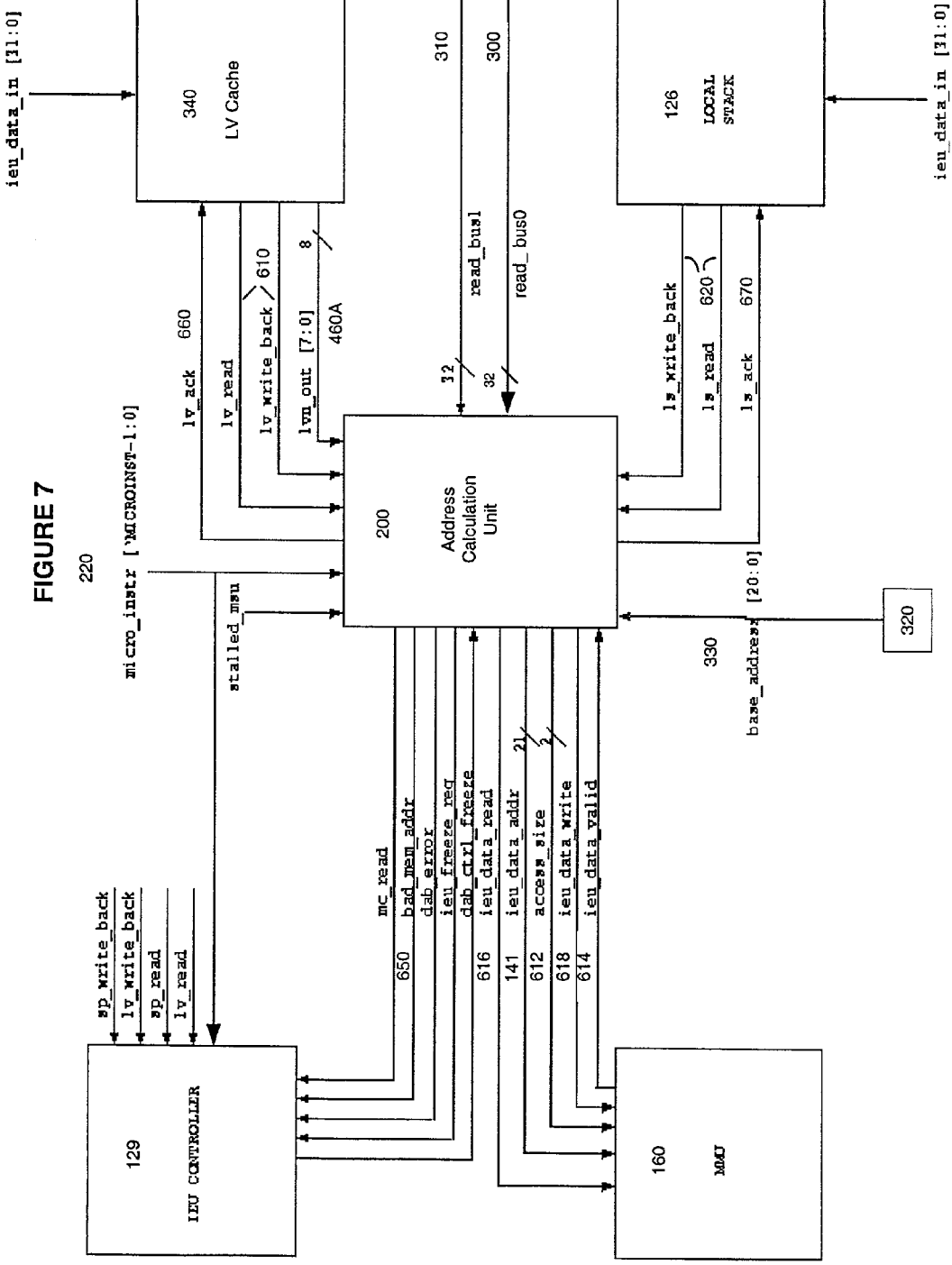
FIG. 7 illustrates interconnections between the address calculation unit of FIG. 6, and various blocks of an Instruction Execution Unit (IEU) and external memory.

FIG. 7 illustrates interconnections between the address calculation unit 200 of FIG. 6, with external memory 160, IEU controller 129, local variable cache 340, stack cache 126, and base address register 320, read0 300, and read1 310.

Because there can be multiple memory accesses at any given time (i.e. by a microinstruction 220, stack cache 126 or local variable cache 340), a sense of priority is established. By way of example, address calculation unit 200 may be designed in accordance with the following priority scheme:

(Highest Priority) Stack cache based writes;
Local variable cache based writes;
Stack cache based reads;
Local variable cache based reads; and
(Lowest Priority) Microinstruction-based reads and writes.

The above priority scheme may be implemented by hardware request logic block 600, first selection logic block 690, and second selection logic block 640, in a manner known by those skilled in the art.

Figure 8:
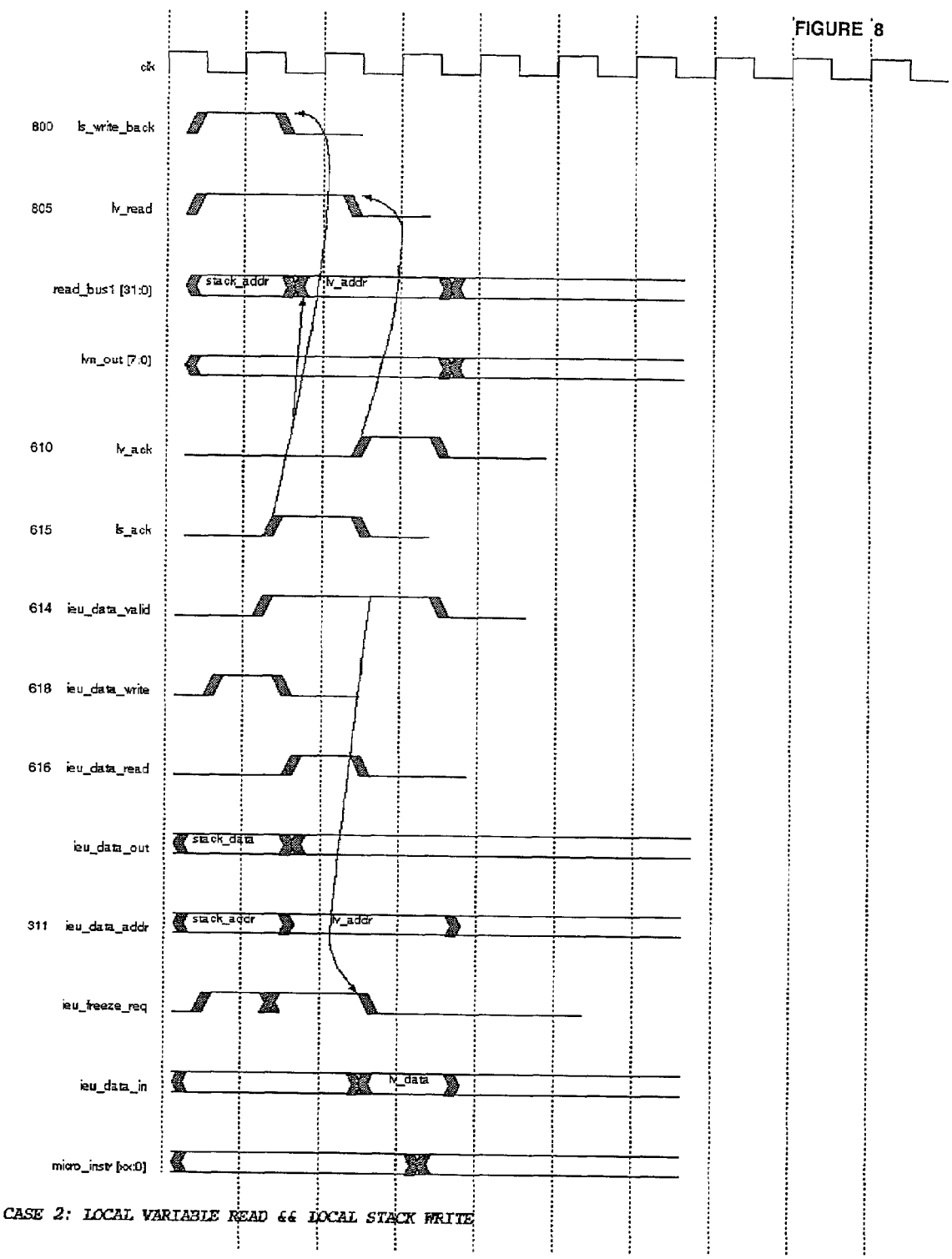
FIG. 8 illustrates a timing waveform wherein the address calculation unit receives local variable read and local stack write-back memory requests simultaneously.

FIG. 8 illustrates a timing waveform of an example wherein the address calculation unit receives local variable read and local stack write-back memory requests simultaneously. According to the above-described priority scheme, the local stack write back is to be conducted prior to the local variable read request. The local stack block continuously asserts its data on the buses until the acknowledge signal is received by the address calculation unit at which point it can de-assert its request or keep it asserted and change the address to request another memory access. This minimizes the latency between memory requests when switching from one block's memory request to the next.

Once the write_back/read signal goes low (which it will do once the ls_ack/lv_ack is received and there are no more requests for that block), a multiplexer for read_bus1 will switch to the next request (before the next rising edge of the clock) so that the request can be sent to the MMU on the next rising edge.

In one embodiment, in order to advantageously service a memory request per clock cycle, the requesting block (stack cache 126, or local variable cache 340) may lower its request right after receiving an "acknowledge" 660 or 670 signal from address calculation unit 200. Failing this, address calculation unit 200 may interpret it as requesting multiple accesses and proceed accordingly.

Similarly, the block can keep its request signal 610 or 620 asserted and change the data inputs to address calculation unit 200 if it wants to do another memory access after finishing the first request.

One skilled in the art will understand that the multiplexer selection control signals in the address calculation unit 200 are timed and synchronized as to place the appropriate values on the read1 310 lines to the address calculation unit 200 so that it can calculate the appropriate physical address (to supply external memory) while the corresponding block supplies the corresponding data to external memory.

Address Calculation Unit Errors

The address calculation unit 200 may assert a bad_mem_ addr signal 650 when it has calculated an incorrect address. This may be due to a misaligned access or an out of bounds address. For example, in an embodiment where everything stored in the IEU is 32 bits wide, it is possible to generate a 32-bit address. Where processor core 100 only supports a 24-bit address space, the address calculation unit 200 may generate an error if bits [31:24] are set.

Figure 9:
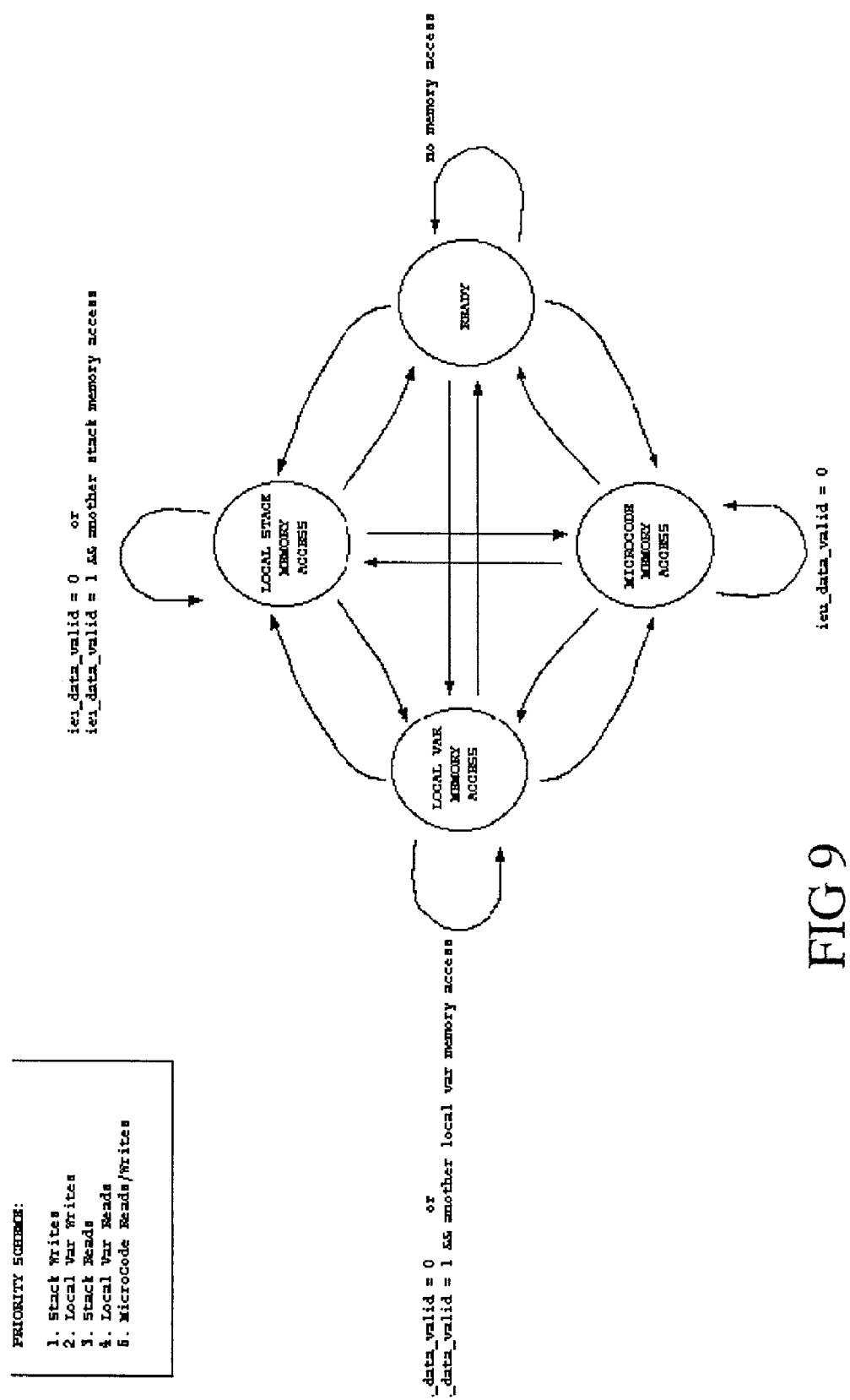
FIG. 9 illustrates exemplary states of a finite state machine (FSM) of an address calculation unit controller.

In embodiments where all accesses must be aligned, address calculation unit 200 may assert bad_mem_addr signal 650 (which could lead to an interrupt) if an access is not aligned. For instance, in such an embodiment, address calculation unit 200 may generate an error signal whenever accesses are not aligned as follows:

32 bit accesses must be on 0, 4, 8, C boundaries 16 bit accesses must be on 0, 2, 4, 6, 8, A, C, E boundaries Finite State Machine State Diagram Finite state machine (FSM) 606 of address calculation unit controller 400, is illustrated in FIG. 9. The states of FSM 606 may include:

Stack cache 126 memory access state 900;
Local variable cache 340 memory access state 910;
Microinstruction 220 based memory access state 915; and
Ready state 920.

In some embodiments, FSM 606 may grant memory requests on every clock cycle as the case dictates. Therefore, instead of returning to "Ready" state 920 after servicing a memory request, it must be able to go to any other state to initiate another memory request.

FSM States

Ready state 920 (x00): waiting for the memory requests

Any memory requests that are received will send the FSM 606 to the correct state based on the priority scheme.

Local stack memory access state 900 (x10): waiting for the valid signal coming for the stack cache access.

Read: Stack Miss

Write: Stack Spill

Local variable memory access state 910 (x20): waiting for the valid signal coming for the local variable access.

Read: Cache Miss

Write: Cache Dirty Bit Set

Microinstruction memory access state 915 (x30): waiting for the valid signal coming for the microinstruction access.

Using address calculation unit 200 to generate the address of an array element, the following general equation applies:

@=arrayindex*scaling factor+array header offset+ array base address

Wherein @ represents the address asserted on address bus 141, arrayindex comprises an input applied at inputs 460C or 500, selected as the input to third input multiplexer 420C; scaling factor is implemented by an array data-type dependant number of left shifts, carried out in shifter 410C; array header offset is an object-oriented data-structure offset 470 selected by offset multiplexer 430, and array base_address is stored in base address register 320, applied as an input to second input multiplexer 420B via dedicated base address connection 330.

Since an array can consist of many different types (bytes, chars and shorts, integers, and longs), the arrayindex must be scaled by the appropriate factor (1, 2, 4, or 8) depending on the data type of the array. Microinstruction portion Mx 604 would correspond to the data type of the array to control shifter 410C and affect the required scaling on arrayindex.

FIG. 10 illustrates how the present invention may be used to access array elements, stored in array object data structures.

Suppose byte array data structure 1000 is stored in external memory beginning at address A000h. A first portion of byte array data structure 1000 comprises an array object header portion 1035. In this example, header portion 1035A comprises two 4-byte (32-bit) entries. A header offset 1015 comprises a value of eight (2 entries×4-bytes/entry). Accordingly, the second portion of byte array data structure 1000, comprising a byte array element portion 1030A, begins at memory location A008h (A000h+header offset 1015). An array index is used to access particular elements of the byte array. As shown in FIG. 10A, each byte array element is stored in a single byte of memory. Accordingly, the array index does not need scaling as the array index directly correlates with the address of each byte array element in the byte array data structure 1000. Consequently, the address of a given byte array element is given by the equation:

$$@=(arrayindex)*1+8+A000h$$

FIGS. 10B, 10C, and 10D illustrate examples array data structures 1005, 1010, 1015 for arrays of char/short, integer, and long data types. While the array data structure header portion 1035 is the same for each array data structure 1005, 1010, and 1015, array element portions 1030B, 1030C, and 1030D differ. Char/short array elements 1030B are stored across two bytes, integer array elements 1030C are stored across four bytes, and long array elements 1030D are stored across eight bytes. To properly address each array element, array indexes for each data type will vary. Array indexes are scaled by factors of 2, 4, or 8 to generate addresses of char/short array elements 1030B, integer array elements 1030C long array elements 1030D, respectively. Accordingly, the addresses of array elements of short/char, integer, or long data types are given by the following equations:

$$\text{Short/char: } @=(arrayindex)*2+8+A000h$$

$$\text{Integer: } @=(arrayindex)*4+8+A000h$$

$$\text{Long: } @=(arrayindex)*8+8+A000h$$

Object-oriented processor core 100 may include opcodes to access array elements of each data type (e.g.: saload, iaload, laload, etc. . . . ). Microprograms corresponding to such opcodes may control address calculation unit 200 via a microinstruction that controls shifter 410A to scale the array index prior to being supplied to adder 440, thereby correctly addressing the correct array element of the given data type.

In the examples taught in FIGS. 10A-10D, all array data structures use a header offset of eight, including eight as one of the object-oriented data structure offsets 470 applied to offset multiplexer 420A. This presents an opportunity to optimize the design of hardware around software to be executed thereon, traversing the traditional hardware/software boundaries.

In one embodiment, the address A000h could be stored in base address register 320 for use by address calculation unit 200 in calculating array addresses. Loading base address register 320 with the base address of the array data structure 1000, 1005, 1010, or 1015 is particularly advantageous in the hardware implementation of JVM bytecodes accessing array elements because the base address is required several times to conduct bounds checking and checking for a null pointer in the array element itself (in the case of an array of objects).

EXAMPLE 1 iaload Instruction

The iaload opcode is a standard JVM opcode that accesses an integer element stored in an array at the position given by an array index (index) and pushes the integer element onto the stack. The iaload opcode is issued as an instruction comprising the opcodes, a first operand comprising arrayRef, a reference to the location of a JVM array object data structure, and a second operand comprising index. Prior to the execution of the iaload instruction, index and arrayRef are pushed onto the stack. The address of the integer array element is generated using array object pointer arrayRef, index, and an array data structure header offset.

Figure 11:
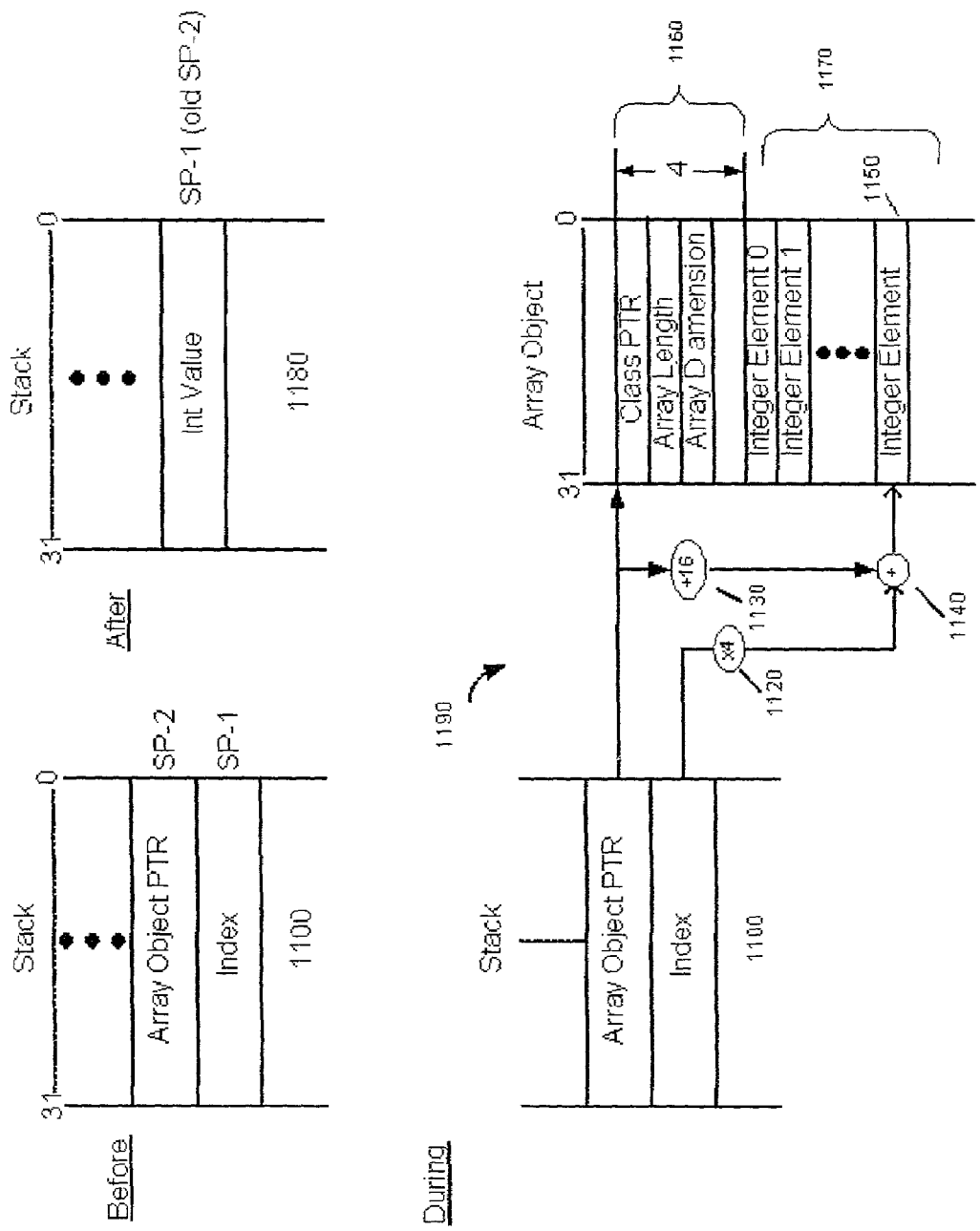
FIG. 11 illustrates an example application in the context of the execution of an iaload instruction.

FIG. 11 illustrates the application of the present invention in the context of the iaload opcode. Stacks 1100 and 1180 illustrate the state of the stack before and after the execution of an iaload instruction. Prior to the execution of the iaload instruction, arrayRef 1105 and index 1110 are pushed onto stack 1100 and are thereby located at TOS-1 and TOS, respectively. The arrayRef 1105 element is accessed to obtain the base address of an array object data structure 1190 stored in external memory 160 (usually in heap memory.)

In this particular implementation of a JVM, the array object data structure 1190 comprises an array header portion 1160 and a plurality of array elements 1170. Array header portion 1160 comprises four header entries (not to be confused with the earlier example describing a 4-byte header). Header entries may include a reference to the class of the array, the dimensions of the array, the length of the array, and the like. Thus, the integer elements stored in the array begin with the fifth entry in array object data structure 1190.

Consequently, to access any of the array elements 1170 an array header offset 1130 must be factored into the address calculation. Because each header entry comprises 4-bytes (32-bits), the array header offset 1130 is 16 (4 entries×4 bytes/entry). The first integer element of the array (element zero) is located at the address arrayref+16. One skilled in the art will understand that the specific structure of an array object is implementation dependent, thus the value of this offset may vary. The index 1110 operand may now be used to locate the target integer element. As described above, index 1110 for integer array elements represents 4-byte entries. Accordingly, index 1110 is scaled prior to calculating the address of the array element at index 1150. In the present embodiment, index 1110 is scaled 1120 by multiplying by four to convert it to byte units. Finally, integer array elements may be accessed by adding the scaled array index to the sum of arrayRef and the scaled header offset.

Execution of an iaload instruction begins with verifying that arrayRef 1105 does not comprise a null value. In a first clock cycle, a first microinstruction 220 may instruct the stack cache 126 to place the TOS-1 value (arrayRef) on a read bus (300 or 310), and to load the value into base address register 320. Simultaneously, the first microinstruction 220 instructs a status port (not shown) in the IEU 128 to read the value on the read bus (300 or 310) and test the value for zero (null). In a second clock cycle, a second microinstruction 220 instructs stack cache 126 to place the TOS value (index) on a read bus (300 or 310), the second microinstruction 220 also instructing the address calculation unit 200 to generate an address as follows:

Base Address+n, wherein n is an offset supplied by object-oriented data structure offset block 470 that represents the location of an array length value in array header portion 1160. In a single clock cycle, the address calculation unit 200 generates the address of the array length element using the base address register 320 and one of the object-oriented data structure offsets 470. Once the array length value has been read from external memory 160, a portion of the second microinstruction 220 instructs the status port of IEU 129 to compare the value of the array length (as read from memory) and index 1110, thereby conducting bounds checking on the array. It should be understood that the status port may be substituted with other comparator means such as ALU 110. Finally, the integer array element 1150 may be accessed. A third microinstruction 220 instructs stack cache 126 to place the TOS value (index) on a read bus (300 or 310). The third microinstruction 220 also instructs address calculation unit 200 to carry out the following:

- third input multiplexer 420C selects the read bus carrying index 1110;
- shifter 410C shifts left two;
- second input multiplexer 420B selects dedicated connection 330;
- offset multiplexer 430 selects the offset corresponding to an offset of 16;
- Address multiplexer 680 selects the output of adder 440; and
- Address calculation unit controller 400 is instructed to generate a read signal to external memory 160.

It should be noted that first input multiplexer 420A defaults to selecting the output of offset multiplexer 470 and always does so except when a local variable cache is generated request via hardware request input 610.

As is seen above, the execution of the iaload instruction uses base address register 320 (twice), and two object-oriented data structure offsets 470. Furthermore, several addresses are generated in a single machine clock cycle to ultimately access an integer array element stored in an array data structure in external memory 160.

EXAMPLE 2 invokeVirtualQuick

Figure 12:
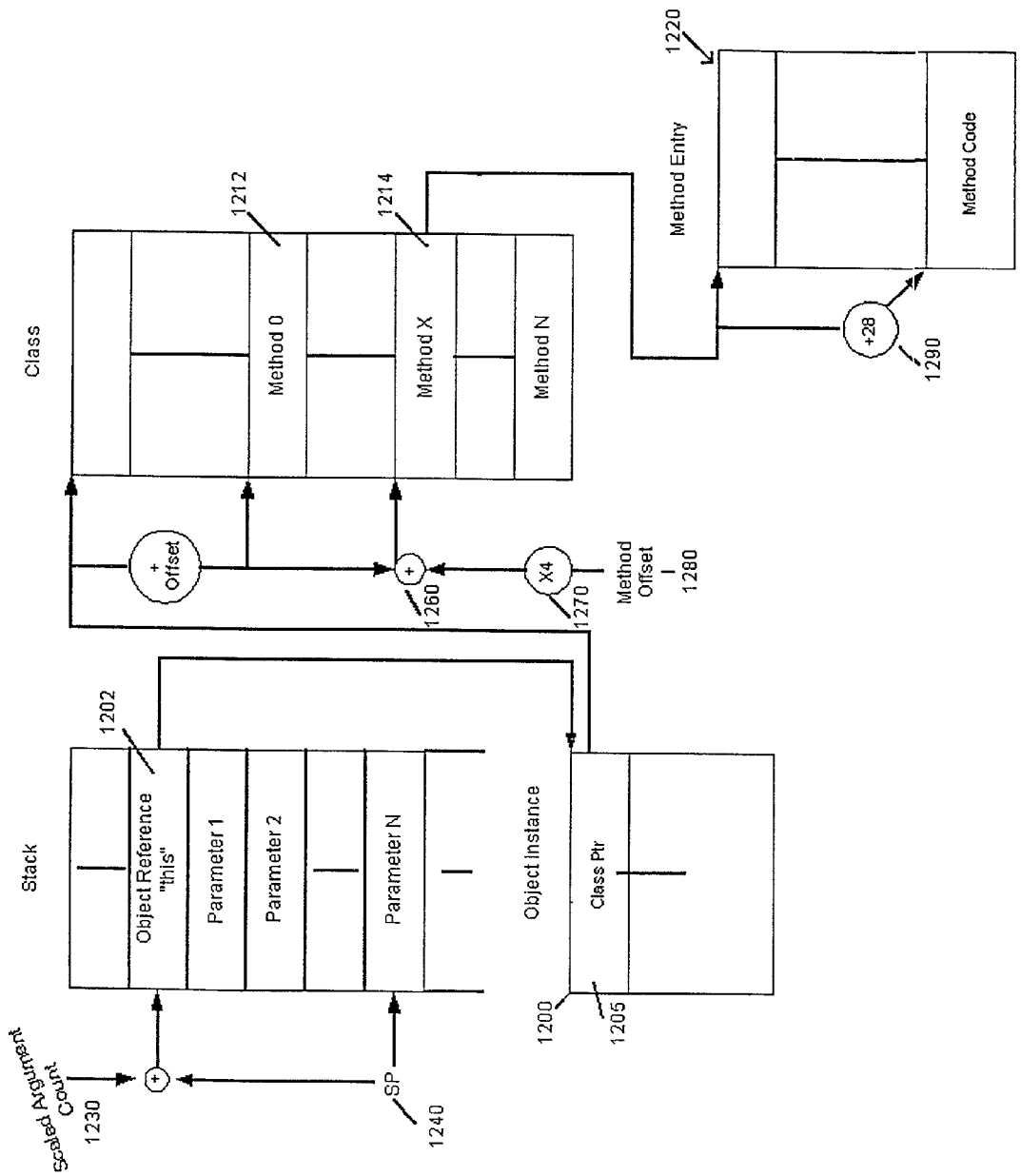
FIG. 12 illustrates an example application in the context of the execution of an invokeVirtualQuick instruction.

Referring now to FIG. 12, the major steps in the execution of an invokeVirtualQuick instruction is illustrated.

The invokeVirtualQuick opcode is a quickened invoke opcode. The invokeVirtualQuick opcode includes two operands. The first operand, argsCount, is a pre-scaled value representing the number of arguments pushed onto the stack 1205 for the method being invoked. The second operand, methodIndex 1280, is a pre-scaled index into the method pointer table 1212 of a class data structure 1210.

Prior to the execution of the opcode, the caller pushes a reference to the object 1202 and any arguments to be passed from to the method onto the stack 1205. The object reference 1202, commonly known in the art as the "this" pointer, is utilized repetitively in the execution of an invokeVirtualQuick instruction. Using the address calculation unit described herein, invokeVirtualQuick instructions may be sped-up significantly in a Java native processor or the like.

The first operand, argsCount, is accessed from the operand processor 350 and stored into base address register 320. To access object reference 1202 from stack memory 1205, address calculation unit 200 generates the address of the object reference 1202 in stack memory 1205. To generate the address, the inputs to address calculation unit 200 include the stack pointer (stored in a register in the register file 124 or in stack cache 126) and argsCount. Accordingly, the base address register 320 is selected by second multiplexer 420B, and third input multiplexer 420C selects read0 300 or read1 310, whichever is carrying the stack pointer value. The address is applied to external memory 160 via address bus 141 and object reference 1202 is read from external memory 160. When the object reference 1202 is obtained from memory, it is stored immediately in base address register 320. The first element contained in the object data structure 1200 is a class pointer 1205 to the base address of a class data structure 1210 representing the class of object 1200. A second read from external memory 160 is generated using only the value in the base address register 320 (object reference 1202) to obtain the class pointer 1205. When class pointer 1205 is obtained from memory, it is written back to base address register 320.

A third memory read is initiated by the invokeVirtualQuick to access the method entry pointer 1214. The address of method entry pointer 1214 is generated in address calculation unit 200 using:
  the content of base address register 320 (containing value of class pointer 1205);
  the second operand, methodIndex, provided by the operand processor 124; and
  a class object 1210 method table offset 1260.

It should be noted that methodIndex requires scaling 1270. In a single clock cycle, a microinstruction instructs the operand processor to provide the second operand on one of the read buses, while the address calculation portion of the same microinstruction instructs the address calculation unit 200 as follows:
  offset multiplexer 430 selects a data structure offset 470 corresponding to method table offset 1260;
  second input multiplexer 420B selects the dedicated connection 330 to base address register 320;
  third input multiplexer 420C selects the read bus (300 or 310) carrying the second operand 1280;
  shifter 410C shifts the output of third input multiplexer left two bits;
  addend multiplexer 630 selects the output of shifter 410C; and
  address multiplexer selects the output of adder 440.

Once accessed from external memory 160, the method entry pointer 1214 is written back to base address register 320. The method entry pointer 1214, stored in the base address register 320, is utilized twice more in the execution of the invokeVirtualQuick opcode to access a scaled local variable count, stored in the method entry 1220, when calculating the value of the stack pointer in the method's context (as opposed to the caller's context), and once more to access a current class pointer, to be stored in a current class register in register file 124. Finally, the method entry pointer 1214, stored in the base address register 320, is used to calculate a new program counter value to be stored in a program counter register in register file 124.

Those skilled in the art will understand execution of the invokeVirtualQuick opcode may include further steps such as checking for null references, pushing the caller's execution context onto the stack, and calculating new values for the frame pointer, stack pointer and local variable pointer.

Accordingly, using the address calculation unit of the present invention may accelerate object-oriented, such as invokeVirtualQuick, and other instructions. The acceleration of invoke opcodes provides a significant advance in the art of hardware Java processing.

In one embodiment, invokeVirtualQuick, and other invoke opcodes are executed in embodiments practicing hardware stack chunking. In such embodiments, the first element in the method entry data structure 1210 may comprise an invokeCount value. The invokeCount value comprises the maximum number of bytes of stack memory 1205 that the method may require. Specifically, the invokeCount comprises the maximum local stack operand size, the number of local variables, and the size of the return execution context frame. Hardware stack chunking compares the sum of invokeCount and the stack pointer 1240, with a stack limit (not shown), stored in a stack limit register, to determine whether the current stack chunk 1205 can accommodate the method frame of the invoked method. When this technique is employed, the address calculation unit 200 of the present invention may be used by accessing the invokeCount value using the method entry pointer, stored in base address register 320. In another embodiment, invokeCount may be stored in an entry other than the first entry of method entry data structure 1210, and an object-oriented data structure offset 470 could be used when accessing the invokeCount value.

While the above description teaches significant advantages made possible by the use of the present invention in the context of executing an invokeVirtualQuick instruction, the present invention is equally beneficial to the execution of other invoke instructions, as well as most other opcodes requiring access to memory, and in particular, to object-oriented data structures, providing a significant advance in the art of hardware object-oriented language processing.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth. It is understood, therefore, that the present invention should be limited by the claims that follow.

What is claimed is:

1. In an object-oriented language processor that generates a microinstruction for an opcode, an address calculation unit (ACU) comprising:
  an input for receiving selection data from the microinstruction;
  differentiation circuitry receiving the selection data for determining if the address calculation unit will operate on this microinstruction;
  one or more inputs for receiving a local variable pointer, stack pointer, or base address;
  a selecting circuit receiving one of the local variable pointer, stack pointer, and base address, for identifying the location of a specific object structure in memory;
  one or more inputs for receiving a local variable number, the local variable number being indicative of a specific element in the object structure;
  a scaling portion for scaling the local variable number; and
  a generating portion for generating a memory address for the element contained in the object structure by using the scaled local variable number, the generating portion operating responsive to the differentiation circuitry;
wherein the generating portion generates the memory addresses in a single processor clock-cycle.

2. The address calculation unit of claim 1 further comprising a memory, wherein the memory contains one or more base address.

3. The address calculation unit of claim 2, wherein the base addresses are the base addresses of the object oriented data structures.

4. An object oriented processor comprising:
an Address Calculation Unit (ACU), the ACU comprising:
an input for receiving selection data from a microinstruction;
differentiation circuitry receiving the selection data for determining if the address calculation unit will operate on this microinstruction;
a selecting circuit receiving one of a local variable pointer, stack pointer, or base address for identifying the location of a specific object oriented data structures in memory;
a generating portion for generating memory addresses for elements contained in the object oriented data structures;
wherein the generating portion generates the addresses in a single clock-cycle.

5. The object oriented processor of claim 4, wherein the ACU comprises a circuit, the circuit for providing one or more object oriented data structure offsets to the ACU.

6. The object oriented processor of claim 5, wherein the data structure offsets comprise offsets for data structures used by the object oriented processor.

7. The object oriented processor of claim 6, wherein the processor comprises a Java native processor.

8. The object oriented process of claim 4, wherein the processor further comprises an Arithmetic Logic Unit (ALU) for generating address information for microinstructions not using the ACU.

9. A method of calculating addresses in an object-oriented processor, the method comprising:
receiving a microinstruction at an Address Calculation Unit (ACU), the microinstruction having selection data in a selection argument field;
evaluating the selection data to determine if the received microinstruction is coded to use the ACU
executing, only if the microinstruction is coded to be used on the ACU, the following steps:
a. receiving a base value reference in the microinstruction indicative of a location of an object oriented data structure;
b. receiving an index reference in the microinstruction indicative of a location of an element within the object oriented data structure;
c. scaling the index to produce a scaled index; and
d. adding the scaled index to the base value to generate an address, wherein steps a. to d. are accomplished in a single clock cycle of the processor.

10. A processor including an Address Calculation Unit (ACU), the ACU comprising:
a. an input for receiving selection data from a microinstruction;
b. differentiation circuitry receiving the selection data for determining if the address calculation unit will operate on this microinstruction;
c. a circuit for receiving a control word from the processor;
d. a circuit for receiving a stack pointer, a local variable pointer, and a base address;
e. an adder circuit;
f. a selecting circuit for selecting one of the stack pointer, local variable pointer and base address, the selecting circuit producing an output comprising a location of a specific object structure in memory, the output coupled to the adder;
g. a circuit for receiving a local variable number, the local variable number being indicative of a specific element in the object structure; and
h. a circuit for shifting the local variable number, coupled to the circuit for receiving a local variable number, the circuit for shifting producing a shifted local variable number output, the output coupled to a second port of the adder.

11. A processor comprising:
an Address Calculation Unit (ACU), the ACU comprising inputs for receiving arguments in a microinstruction that reference object oriented data structures, the inputs comprising:
a first input for receiving an argument indicative of the location of a specific object structure; and
a second input for receiving an argument indicative of the offset for a specific element in the object structure;
the ACU further comprising a selection input for receiving a selection argument from the microinstruction, the selection argument being used by differentiation circuitry for determining if the microinstruction is enabled to use the ACU.

12. The processor of claim 11, wherein the arguments comprise absolute addresses for the data structures, and a control word.

13. The processor of claim 12, wherein the control word can specify an operation, a scaling factor, and an offset.

14. The processor of claim 11, wherein the ACU comprises a control for receiving inputs from one or more processor hardware blocks to generate addresses for elements of the object oriented data structures.

15. The processor of claim 14, wherein the addresses are generated in one processor clock cycle.

16. The processor of claim 11, further comprising a separate Arithmetic Logic Unit (ALU) for generating address information for microinstructions not using the ACU.

* * * * *